United States Patent
Rüger

(10) Patent No.: US 9,073,542 B2
(45) Date of Patent: Jul. 7, 2015

(54) METHOD FOR PERFORMING A BOOST OPERATION OF A HYBRID VEHICLE

(71) Applicant: Dr. Ing. h.c.F. Porsche Aktiengesellschaft, Stuttgart (DE)

(72) Inventor: Sebastian Rüger, Ludwigsburg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 95 days.

(21) Appl. No.: 14/052,869

(22) Filed: Oct. 14, 2013

(65) Prior Publication Data

US 2014/0106928 A1    Apr. 17, 2014

(30) Foreign Application Priority Data

Oct. 15, 2012    (DE) .......................... 10 2012 109 791

(51) Int. Cl.
    *B60W 20/00*    (2006.01)

(52) U.S. Cl.
    CPC ............... *B60W 20/10* (2013.01); *Y10T 477/26* (2015.01); *Y10T 477/23* (2015.01); *B60W 20/1088* (2013.01); *Y10S 903/93* (2013.01); *Y02T 10/6286* (2013.01)

(58) Field of Classification Search
    CPC   B60W 20/1088; B60W 20/10; Y10T 477/26; Y10T 477/23; Y02T 10/6286; Y10S 903/93
    See application file for complete search history.

(56) References Cited

U.S. PATENT DOCUMENTS 7,784,573 B2 *   8/2010   Kluge et al. ............... 180/65.22
8,257,221 B2 *   9/2012   Leufgen ........................... 477/3

FOREIGN PATENT DOCUMENTS

DE            103 59 071 B3     8/2005
DE      10 2007 003 756 A1     7/2008

OTHER PUBLICATIONS

Michael Harley, 2014 Porsche 918 Spyder, Internet: Autoblog.com, 11 pages, Oct. 1, 2012.
German International Search Report DE 10 2012 109 791.7 dated Jul. 17, 2013 with partial English translation.

* cited by examiner

*Primary Examiner* — Sherry Estremsky
(74) *Attorney, Agent, or Firm* — RatnerPrestia

(57) ABSTRACT

A method for carrying out a boosting mode of a drive unit (3), having at least one internal combustion engine (1) and at least one electric machine (2), of a vehicle (10), in which, in order to prepare the boosting mode, the internal combustion engine (1) is adjusted to an operating state with an increased acceleration potential, and in order to charge an energy accumulator (4) the electric machine (2) is adjusted to a generator mode. When a power demand which is increased compared to the current operating state of the drive unit (3) is present, the charging process is interrupted and at the same time the electric machine (2) is activated in order to increase the driving power of the drive unit (3), wherein the increased acceleration potential which is kept in reserve by the internal combustion engine (1) is utilized.

6 Claims, 1 Drawing Sheet

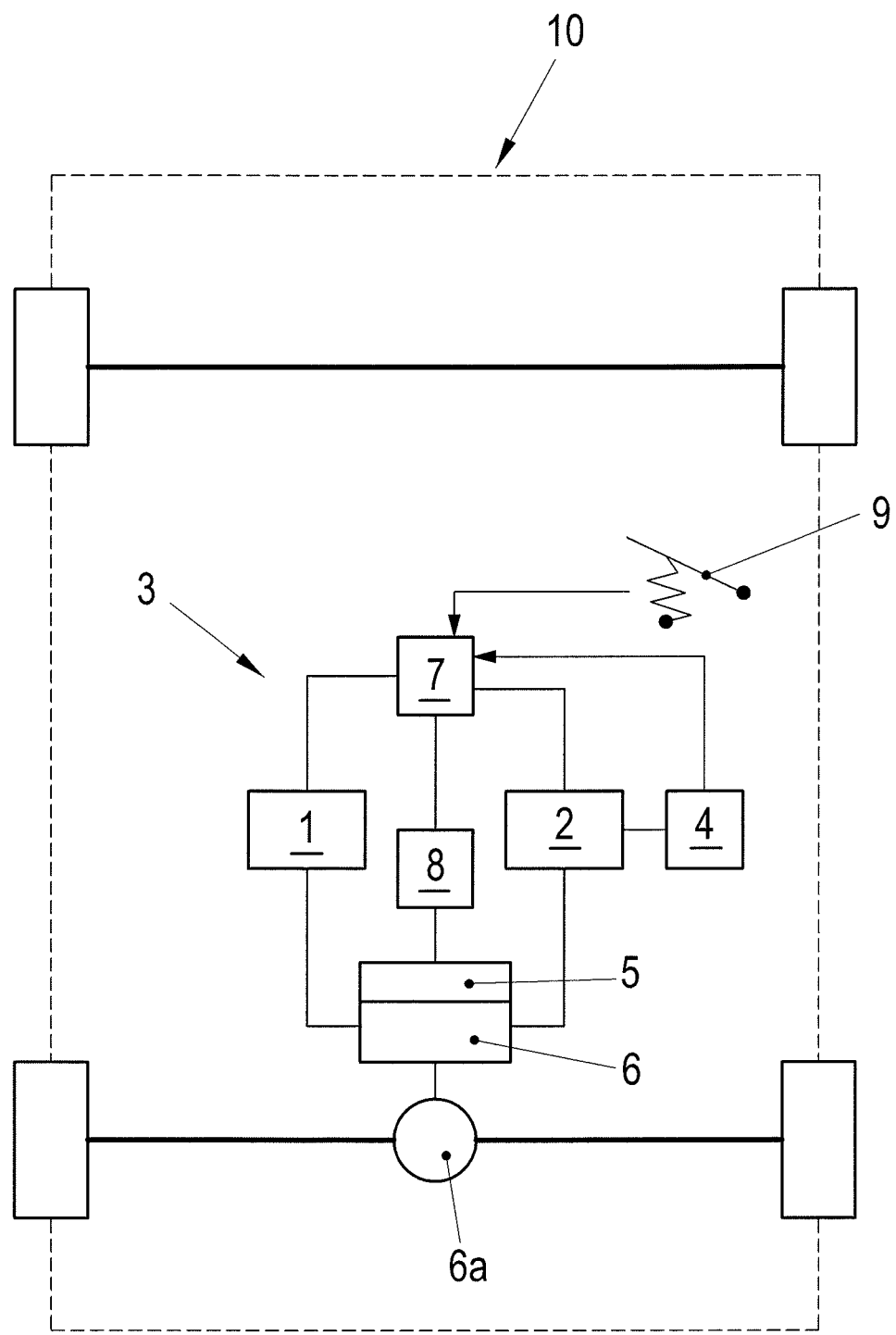

METHOD FOR PERFORMING A BOOST OPERATION OF A HYBRID VEHICLE

CROSS-REFERENCE TO RELATED APPLICATIONS

This application claims priority of German Patent Application No. 10 2012 109 791.7, filed Oct. 15, 2012, which is incorporated by reference herein in its entirety.

FIELD OF INVENTION

The invention relates to a method for carrying out a boosting mode of a drive unit, having at least one internal combustion engine and at least one electric machine, of a vehicle, in particular of a hybrid motor vehicle according to a method for carrying out a boosting mode of a drive unit, said drive unit having at least one internal combustion engine and at least one electric machine, of a vehicle, in which, in order to prepare the boosting mode, the internal combustion engine is adjusted to an operating state with an increased acceleration potential, and in order to charge an energy accumulator the electric machine is adjusted to a generator mode. In addition, the invention relates to a drive unit for a vehicle for carrying out the method according to the invention, comprising:
- an internal combustion engine;
- an electric machine which can be activated in order to increase the driving power of the drive unit of the internal combustion engine; and
- a drive control unit which is designed to adjust the internal combustion engine to an operating state with an increased acceleration potential for the vehicle in order to prepare a boosting mode, and to adjust the electric machine to the generator mode in order to charge an energy accumulator.

BACKGROUND

A generic method is known from DE 103 59 071 B3, in which method, in order to briefly increase the driving power of a drive unit, composed of an internal combustion engine and an electric machine, of a hybrid vehicle, the electric machine is at least temporarily connected to the internal combustion engine for a boosting mode. The electric machine can be operated either to charge an energy accumulator in the generator mode, or in the case of the boosting mode it can be supplied with energy from this energy accumulator.

According to this DE 103 59 071 B3, in a driving mode of the vehicle with a discharged energy accumulator, in which mode a boosting mode cannot be carried out, or can only be carried out to a restricted degree, a gear speed shift operation of a transmission is performed, for example shifting back by one or two gear speeds is performed, with the result that the internal combustion engine is as it were prestressed. At the same time, during this "prestressed" mode the energy accumulator is charged by the electric machine which is driven by the internal combustion engine. If an increased power demand is present, the internal combustion engine can more quickly make available the required power potential owing to the operation at an increased rotational speed; and at the same time the charging process is interrupted with the result that the internal combustion engine is additionally relieved of loading and in this way can additionally make available this power component to satisfy the increased power demand.

SUMMARY

Taking this prior art as a basis, the invention is based on the object of developing a method of the type mentioned at the beginning in such a way that an improved boosting behavior, i.e. faster acceleration when an increased power demand is present, is achieved. In addition, an object of the invention is to specify a drive unit for carrying out the method according to the invention.

The first-mentioned object is achieved by means of a method for carrying out a boosting mode. Such a method for carrying out a boosting mode of a drive unit, having at least one internal combustion engine and at least one electric machine, of a vehicle, in which, in order to prepare the boosting mode, the internal combustion engine is adjusted to an operating state with an increased acceleration potential, and in order to charge an energy accumulator the electric machine is adjusted to a generator mode, is defined according to the invention by the fact that when a power demand which is increased compared to the current operating state of the drive unit is present, the charging process is interrupted and at the same time the electric machine is activated in order to increase the driving power of the drive unit, wherein the increased acceleration potential which is kept in reserve by the internal combustion engine is utilized.

With this method, a significant increase in the acceleration and the dynamics of the vehicle is achieved, in particular an improved performance during acceleration from constant travel is brought about. This is because, on the one hand, owing to the operating state of the internal combustion engine with an increased acceleration potential and, on the other hand, as a result of the load which brings about further opening of the throttle valve and which is generated by the electric machine operated in the generator mode, this acceleration potential is increased further, with the result that, when the increased power demand is called in addition to the torque generated by the electric machine, said acceleration potential can be converted quickly into increased acceleration.

This method can be implemented in such a way that it is initiated manually by the driver of the vehicle or, if the vehicle is equipped with an automatic transmission, takes place automatically if, for example, a certain adjustment position or predefined adjustment acceleration of an accelerator pedal of the vehicle is detected.

In one refinement of the invention there is provision that, in order to adjust the internal combustion engine to the operating state with an increased acceleration potential, the slip of a transmission clutch is increased and the slip is reduced in order to utilize the increased acceleration potential which is kept in reserve. As a result, it is possible to selectively bring about an increase in the rotational speed of the internal combustion engine in order to thus improve the dynamics thereof in the case of the calling of the increased acceleration potential.

Alternatively or additionally, according to one development of the invention, in order to adjust the internal combustion engine to the operating state with an increased acceleration potential, a gear speed transmission, which increases the rotational speed of the internal combustion engine, of a transmission of the vehicle can be performed. This may be the gear speed which is optimum for acceleration, in order to increase the rotational speed of the internal combustion engine so as to achieve a high acceleration potential.

The second-mentioned object is achieved by means of a drive unit.

Such a drive unit for a vehicle which comprises an internal combustion engine, an electric machine which can be activated in order to increase the driving power of the drive unit of the internal combustion engine, and a drive control unit which is designed to adjust the internal combustion engine to an operating state with an increased acceleration potential for the vehicle in order to prepare a boosting mode, and to adjust the electric machine to the generator mode in order to charge an energy accumulator, is defined according to the invention in that the drive unit is additionally designed, when a power demand which is increased compared to the current operating state of the drive unit is present, to interrupt the charging process and at the same time to activate the electric machine in order to increase the driving power of the drive unit, said activation being carried out in such a way that the increased acceleration potential which is kept in reserve by the internal combustion engine is utilized.

With such a drive unit for a vehicle, in particular a hybrid motor vehicle, the method according to the invention can be implemented easily and cost-effectively since the necessary components are present as a rule in a hybrid motor vehicle and therefore the method according to the invention can be implemented by software.

Furthermore, according to one advantageous development of the invention, a transmission control unit is provided which is designed in such a way that, in order to adjust the internal combustion engine to the operating state with an increased acceleration potential, the slip of a transmission clutch is increased and the slip is reduced again in order to utilize the increased acceleration potential which is kept in reserve.

Finally, according to a last embodiment of the invention it is advantageous if a transmission control unit is provided which is designed in such a way that, in order to adjust the internal combustion engine to the operating state with an increased acceleration potential, a gear speed transmission, which increases the rotational speed of the internal combustion engine, of a transmission is engaged.

BRIEF DESCRIPTION OF THE DRAWINGS

The invention will be described below in detail by means of an exemplary embodiment and with reference to the single appended FIG. 1. FIG. 1 shows a block circuit diagram of a drive unit of a hybrid motor vehicle for carrying out a method according to the exemplary embodiment.

DETAILED DESCRIPTION

The hybrid motor vehicle 10 which is illustrated schematically in the FIGURE is driven by a drive unit 3 which comprises an internal combustion engine 1 and an electric machine 2 which each drive the rear wheels via a transmission 6 and a differential 6a connected downstream. In order to merely briefly increase the driving power of the drive unit 3 of the internal combustion engine 1, the electric machine 2 is connected in parallel, wherein in this case an energy accumulator 4, for example in the form of an accumulator battery, supplies the electric machine 2 with energy. In the generator mode of the electric machine 2, the latter is driven by the internal combustion engine 1 and in the process it charges the energy accumulator 4.

Furthermore, the drive unit 3 has a transmission control unit 8 which, together with the transmission clutch 5 and the transmission 6, forms an automatic transmission. In addition, a drive control unit 7 is provided as an engine control device for adjusting the internal combustion engine 1 and the electric machine 2 as well as for coordinating same.

A boosting mode of the drive unit 3 is prepared during constant travel of the hybrid motor vehicle 10 by virtue of the fact that the electric machine 2 is adjusted to the generator mode, with the result that the electric machine 2 constitutes a load for the internal combustion engine 1 and consequently the throttle valve is opened further. In this state, a portion of the torque generated by the internal combustion engine 1 is required to move the hybrid motor vehicle 10, and the other portion is required to drive the electric machine 2. At the same time, a signal for the transmission control unit 8 is generated by the drive control unit 7, as a result of which increased slip is generated at the transmission clutch 5, which increased slip brings about a further increase in the rotational speed of the internal combustion engine 1 without the velocity being reduced here. In this state, the internal combustion engine 1 has an acceleration potential which is increased compared to the normal mode and which can be spontaneously called when there is an increased power demand by the driver.

In order to keep the internal combustion engine 1 in a state with an increased acceleration potential, the transmission 6 can be actuated by the drive control unit 7, additionally or as an alternative to increasing the slip, in such a way that a gear speed which is optimum for acceleration is engaged, as a result of which the engine rotational speed of the internal combustion engine 1 is likewise or additionally increased without, however, the speed of the vehicle being reduced.

The boosting mode is initiated if an increased power demand, generated by the driver, for example, by activating the accelerator pedal 9 with the exceeding of a specific position and/or adjustment acceleration, is detected by the drive control unit 7 in this state of the drive unit 3 which prepares the boosting mode and in which, therefore, the internal combustion engine 1 keeps an increased acceleration potential in reserve and the electric machine 2 is operated in the generator mode.

For this purpose, the drive control unit 7 controls the drive unit 3 in such a way that the charging process of the energy accumulator 4 is abruptly interrupted and at the same time the electric machine 2 of the internal combustion engine 1 is activated and, if appropriate, the transmission clutch 5 is closed through corresponding actuation in order to reduce the increased slip. At this moment, the electric machine 2 makes its full motor torque available, and at the same time the increased acceleration capability of the internal combustion engine 1 which is kept in reserve acts because of the increased engine rotational speed (as a result of the increased slip and/or reduced gear speed number) and the load which opens the throttle valve further. This makes an increased acceleration capability during acceleration from constant travel possible for the hybrid motor vehicle 10, wherein this dynamic can be called immediately by the driver when the increased power demand is present.

The preparatory phase of the boosting mode can take place automatically, for example manually by the activation of an activation means, such as, for example, a knob, or automatically.

What is claimed:

1. A method for carrying out a boosting mode of a drive unit (3), said drive unit having at least one internal combustion engine (1) and at least one electric machine (2), of a vehicle (10), in which, in order to prepare the boosting mode, the internal combustion engine (1) is adjusted to an operating state with an increased acceleration potential, and in order to charge an energy accumulator (4) the electric machine (2) is adjusted to a generator mode, wherein when a power demand which is increased compared to the current operating state of the drive unit (3) is present, the charging process is interrupted and at the same time the electric machine (2) is activated in order to increase the driving power of the drive unit (3), wherein the increased acceleration potential which is kept in reserve by the internal combustion engine (1) is utilized.

2. The method as claimed in claim 1, wherein, in order to adjust the internal combustion engine (1) to the operating state with an increased acceleration potential, the slip of a transmission clutch (5) is increased and the slip is reduced in order to utilize the increased acceleration potential which is kept in reserve.

3. The method as claimed in claim 1, wherein, in order to adjust the internal combustion engine (1) to the operating state with an increased acceleration potential, a gear speed transmission ratio, which increases the rotational speed of the internal combustion engine, of a transmission (6) is engaged.

4. A drive unit (3) for a vehicle (10), comprising:
an internal combustion engine (1);
an electric machine (2) which can be activated in order to increase the driving power of the drive unit of the internal combustion engine (1); and
a drive control unit (7) which is designed to adjust the internal combustion engine (1) to an operating state with an increased acceleration potential for the vehicle (10) in order to prepare a boosting mode, and to adjust the electric machine (2) to the generator mode in order to charge an energy accumulator (4),
wherein the drive control unit (7) is additionally designed, when a power demand which is increased compared to the current operating state of the drive unit (3) is present, to interrupt the charging process and at the same time to activate the electric machine (2) in order to increase the driving power of the drive unit (3), said activation being carried out in such a way that the increased acceleration potential which is kept in reserve by the internal combustion engine (1) is utilized.

5. The drive unit (3) as claimed in claim 4, wherein a transmission control unit (8) is provided which is designed in such a way that, in order to adjust the internal combustion engine (1) to the operating state with an increased acceleration potential, the slip of a transmission clutch (5) is increased and the slip is reduced in order to utilize the increased acceleration potential which is kept in reserve.

6. The drive unit (3) as claimed in claim 4, wherein a transmission control unit (8) is provided which is designed in such a way that, in order to adjust the internal combustion engine (1) to the operating state with an increased acceleration potential, a gear speed transmission, which increases the rotational speed of the internal combustion engine (1), of a transmission (6) is engaged.

* * * * *